United States Patent [19]
Shimizu

[11] 4,105,297
[45] Aug. 8, 1978

[54] FIELD EFFECT TYPE LIQUID CRYSTAL DISPLAY DEVICE

[75] Inventor: Kazuhiko Shimizu, Hirakata, Japan

[73] Assignee: Matsushita Electric Industrial Co., Ltd., Osaka, Japan

[21] Appl. No.: 770,298

[22] Filed: Feb. 22, 1977

[30] Foreign Application Priority Data

Feb. 26, 1976 [JP] Japan .................................. 51-21499

[51] Int. Cl.² .................................................. G02F 1/13
[52] U.S. Cl. ........................................ 350/336; 340/336
[58] Field of Search ................. 350/160 LC; 340/336

[56] References Cited

U.S. PATENT DOCUMENTS

| | | | |
|---|---|---|---|
| 3,702,723 | 11/1972 | Borden | 350/160 LC |
| 3,781,863 | 12/1973 | Fujita | 340/336 |
| 3,837,729 | 9/1974 | Harsch | 350/160 LC |
| 3,877,015 | 4/1975 | Kanazaki et al. | 340/336 |
| 3,938,140 | 2/1976 | Garcia et al. | 340/336 |
| 3,945,001 | 3/1976 | Shimakawa | 340/336 |
| 3,989,353 | 11/1976 | Phalan | 350/160 LC |
| 4,023,890 | 5/1977 | Shiraser et al. | 350/160 LC |
| 4,034,368 | 7/1977 | Shimomura | 340/336 X |
| 4,036,550 | 7/1977 | Yih | 350/160 LC |
| 4,050,787 | 9/1977 | Fujita | 350/160 LC |

*Primary Examiner*—Edward S. Bauer
*Attorney, Agent, or Firm*—Stevens, Davis, Miller & Mosher

[57] ABSTRACT

A field effect type liquid crystal display device has electrode segments arranged and shaped such that a uniform orientation of liquid crystal molecules is attained to improve the quality of a displayed image. The electrode is structured such that a down slope is presented to the orientation of liquid crystal molecules at those edges of electrode segments which define an edge of a displayed pattern.

2 Claims, 11 Drawing Figures

Ō a f g e d c b Ō

FIELD EFFECT TYPE LIQUID CRYSTAL DISPLAY DEVICE

The present invention relates to a field effect type liquid crystal display device which has electrode segments arranged and shaped such that a uniform orientation of liquid crystal molecules is attained to improve a quality of a display image.

It was observed, in a conventional field seven display segments for displaying digits, that the quality of display was lowered by deterioration of the displaying function of the edge areas of the particular segments among the seven segments with increase of the service period of the device.

According to the present invention, a utilization is made of one significant difference between the state of liquid crystal molecules adjacent to the particular segment edge portions towards the corresponding electrode segments and the state of liquid crystal molecules adjacent to the other segment edge portions towards the corresponding electrode segments, and there is provided an improved field effect type liquid crystal display device having removed the above conventional defect by improving the shape and mutual positional relation of the front and back electrode segments so as to hold these liquid crystal molecules in a common state made free from such a defect towards the respective electrode segment portions.

The further objects, features and advantages of the present invention will be apparent from the following description taken in conjunction with the accompanying drawings, in which FIG. 1 shows a basic structure of a conventional field effect type liquid crystal display device;

Figure 1:
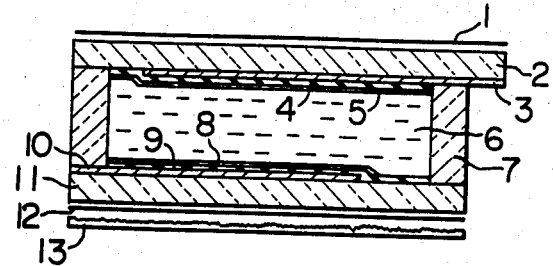
Figure 2:
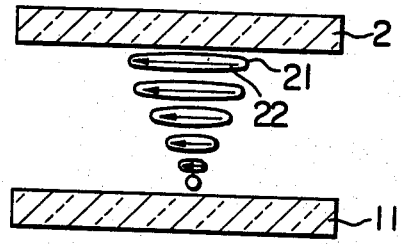
FIG. 2 shows exemplarily a static state of orientation of the liquid crystal molecules used in the device of FIG. 1.
Figure 6:
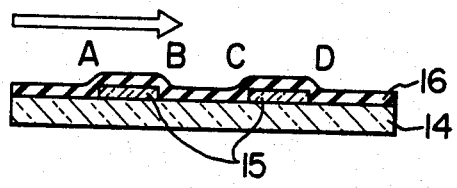
FIG. 6 shows exemplarily a sectional view of the electrodes of FIG. 4.

In FIG. 1 showing a basic arrangement of a field effect type liquid crystal display device, the reference numeral 1 designates a polarizer plate, 2 a front glass plate or transparent insulating plate, and 3 a transparent electrode which is generally a transparent film made of indium oxide or tin oxide by evaporation technique or sputtering technique and which are generally divided into plural electrode portions by etching technique, mask evaporation technique or liftoff technique etc. Numeral 4 designates a transparent insulating layer attached for making uniform the surface of the front glass plate 3 provided with the electrode, which layer is generally made of SiO, $SiO_2$, $Y_2O_3$ etc. having a thickness in the order of 500 to 2000 Å by evaporation technique, 5 an alignment control film which is generally made of $MgF_2$, SiO, etc. evaporated slantingly to the lower insulating layer 4 or which may be such a film provided on the lower layer 4 and rubbed in a desired one direction by cotton etc. so that the molecules of liquid crystal are oriented as shown in FIG. 2, and 6 liquid crystal which is a so-called p-type liquid crystal of nematic liquid crystal and which may be usually any one of the following liquid crystal mixtures.

Figure 3:
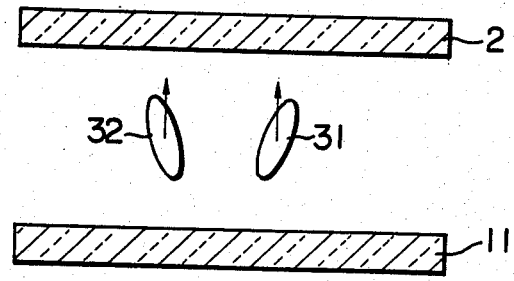
FIG. 3 shows exemplarily a state of the liquid crystal molecules which stand up by the application of a voltage across front and back electrodes of the device of FIG. 1.

(A) a mixture of p-alkoxy-p'-alkylazomethine derivative and p-cyano-azomethine derivative (B) a mixture of p-alkoxy-p'-alkylazoxybenzene derivative and p-alkyl-p'-alkylazoxybenzene derivative (C) a mixture of p-cyanobiphenyl derivative (D) a mixture of p-alkyl-p'-cyanophenyl ester and p-cyanobiphenyl derivative Likewise, in FIG. 1, numeral 8 designates an alignment control film, 9 a lower transparent insulating layer, 10 a back electrode and 11 a back glass plate 11 which are respectively made of the same material as that of the alignment control film 5, lower insulating layer 4, front electrode 3 and front glass plate 2, and which have respectively the same role or function as that of the front side elements. Numeral 12 designates an analyzer plate; 13 a random reflection plate (there is a device not including such a reflection plate); 7 a seal means mounted around the front glass plate 2 and back glass plate 11 which forms a box containing the liquid crystal and is generally made of a low-melting point glass material, epoxy resin, etc. to make the liquid crystal layer of a uniform thickness in the order of 6 to 20 μm by using glass-frit etc. For the sake of simplification of explanation, it is assumed that the direction of the di-pole moment of the p-type liquid crystal is substantially parallel to the direction of the longitudinal axis of the liquid crystal molecule, although it is actually displaced from the parallel condition as shown in FIG. 3 which shows the orientation of the liquid crystal molecules under the application of a voltage across the opposite electrodes.

Generally the liquid crystal molecules are aligned in a particular direction by the alignment control films 5 and 8. As shown in FIG. 2 in which numeral 21 designates a liquid crystal molecule and 22 the direction of the di-pole moment, when it is viewed from the front side of the glass plate 2, the liquid crystal molecules are spirally rotated in the advancing direction of a right-handed screw so that the orientation of liquid crystal molecules adjacent to the back glass plate side is rotated by about 90° from the orientation of liquid crystal molecules adjacent to the front glass plate side. Although the alignment control films 5 and 8 are provided to cause such an alignment of liquid crystal molecules, a little amount of cholesteric liquid crystal may be added to the above liquid crystal mixture so that such an alignment is easily made.

By the application of a voltage of 1.5 to 6 volts across the front electrode 3 and back electrode 10 (generally a portion of the back electrode 10 being guided onto the front glass plate 2 by making portion of the seal means 7 electrically conductive for the voltage applied), the liquid crystal molecules vertically stand up owing to their di-pole moment with the result of extinction of the spiral arrangement of liquid crystal molecules. Namely, with the application of no voltage, the crystal molecules are spirally rotated in the advancing direction of the right-handed screw (as shown in FIG. 2) and light beam incoming from the front glass plate is deflected by about 90° to go out of the device. On the other hand, with the application of the voltage which changes the orientations of the liquid crystal molecules to extinguish the spiral arrangement, the incoming light beam is allowed to remain in a straight line. When these light beams are viewed through the polarizer and analyzer plates 1 and 12, it is observed that they are passed through or interrupted by the on or off operation of the applied voltage which enables an optical indication of a pattern defined by the front electrode 3 and back electrode 10. However, in a practical field effect type liquid crystal display device, the direction of the longitudinal axis of the liquid crystal molecule slightly displaces from the direction of the di-pole moment as shown by the numerals 31 and 32 in FIG. 3 which shows two different stand-up mode of the molecule by the application of the voltage. The principal causes for this difference are:

1. With the application of voltage there are two operations such that liquid crystal molecules near the front glass plate firstly stand up, or alternatively liquid crystal molecules near the back glass plate firstly stand up;

2. Next with the off-operation of the applied voltage, there are also two operations such that the liquid crystal molecules return to their original states through right-rotation or alternatively return to their original states through left-rotation, and the subsequent application of the voltage causes the two standing-up states shown in FIG. 3. In order to avoid the two uncertain operations in the above paragraph 1, one counter-measure may be adopted such that liquid crystal molecules near the front glass plate are made to stand up always first by the application of a voltage, not by arranging liquid crystal molecules parallelly to the front glass plate in the vicinity of the same, but by arranging them with a certain angle of $\alpha$ to the front glass plate. In order to avoid the uncertain return operations in the paragraph 2, a further countermeasure may be adopted such that the angular difference of the spiral arrangement (i.e., the angular difference between the orientation of the longitudinal axis of the crystal molecules adjacent to the front glass plate side and that of the crystal molecules adjacent to the back glass plate side) is slightly changed from 90°, for example, to 95°, alternatively such that a little amount of cholesteric liquid crystal is added in order to exclusively establish the right-rotation characteristic of the applied liquid crystal. By effecting this countermeasure the liquid crystal molecules are uniformly slanted slightly rightwards as shown by the numeral 31 in FIG. 3 when the voltage is applied.

On the other hand, front and back electrodes of a prior art display device of the type described above have structures shown in FIG. 4. The front electrode shown by solid lines, has seven electrode segments $a$ to $g$ and the back electrode $\overline{O}$ has a structure shown by dotted lines. Patterns are displayed at areas where the front electrode and the back electrode face to each other. The width of the front electrode is larger than that of the back electrode in order to prevent the apparent pattern from appearing distorted even if the front and back electrodes are misaligned during the assembly. In order to orient the liquid crystal molecules, the front and back electrodes have been rubbed with cotton, paper, diamond paste or the like in a direction shown by an arrow in FIGS. 5A and 5B (In actual fact, the front and back electrode are formed by etching and then insulator such as SiO or $Y_2O_3$ is uniformly vapor deposited thereon as mentioned before.) Thus, the liquid crystal molecules are oriented in the direction of rub. The same effect may be obtained when SiO or the like is vapor deposited obliquely. While the directions of the orientation of the liquid crystal molecules are shown to make a cross angle of 90° to form the spiral arrangement mentioned above referring to FIG. 2, it has been known that the cross angle is preferably a little displaced from 90°.

Next an explanation is made of a difference between the relations of the liquid crystal portion and adjacent electrode segment portion respectively at the edge portion of the particular pattern segment causing the deterioration of the display quality and at the edge portion of the other pattern segments. Explanation is made of the relations between the state of the liquid crystal towards the edge portion of the particular electrode segment portion and the orientation state of the liquid crystal, i.e., the direction of rub, which relations correspond to the generation of the display quality deterioration and to no-generation of such a deterioration.

FIG. 6 generally shows particularly the relations between the direction of the rub (indicated by the arrow) and the edge portions of the front or back electrode portions defining the corresponding edge portions of the pattern segments, so that the liquid crystal, opposite glass plate, aligning control films etc. are not shown therein for the sake of simplification.

Figure 7:
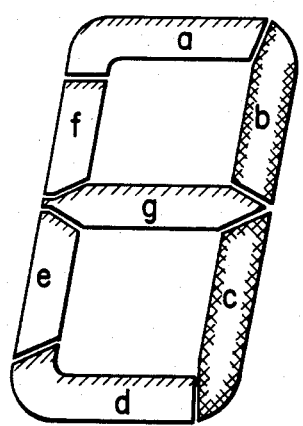
FIG. 7 shows a display of digits by the seven-segment electrode structure of FIG. 4.

FIG. 6 shows a sectional view of a front or back glass plate. On a glass plate 14, transparent electrodes 15 of approximately 500 Å thickness are disposed, on which an insulating layer 16 such as SiO are uniformly vapor deposited. The layer is then rubbed with cotton or the like in the direction of an arrow, so that the liquid crystal molecules tend to be oriented in the direction of the arrow. It has been found, however, that the orientation of the liquid crystal molecules differs between portions A and C at which the arrow goes up slopes of the transparent electrodes 15 and portions B and D at which the arrow goes down the slopes. Namely, for the direction of rub shown by the arrows in FIG. 5, the portions at which the arrows go up the slopes correspond to hatched areas in electrode segments $a$ to $g$ shown in FIG. 7. For example, the upper side area of the segment $a$ hatched in FIG. 7 is defined by the upper edge of the front electrode segment $a$ where the liquid crystal molecules are oriented to go up the slope of the electrode segment according to the arrowed direction of rub shown in FIG. 5A. Likewise the right side area of the segment $b$ hatched in FIG. 7 is defined by the right edge of the central area of the back electrode segment $\overline{O}$ shown in FIG. 4 where the liquid crystal molecules are oriented to go up the slope of the central area of the back electrode segment according to the arrowed direction of rub shown in FIG. 5B.

It has been found that when a voltage is applied to such a display device, the orientation in the hatched areas of FIG. 7 differs from that of other areas.

More specifically, the liquid crystal molecules existing on the greater area of the seven segments stand up in the mode as shown by the numeral 31 in FIG. 3 for example, but crystal molecules existing on the hatched areas of FIG. 7 stand up in the mode as shown by the numeral 32 (hereinafter the latter mode is referred to as an "inverse orientation"). Although several causes are considered causing such an inverse orientation, the most significant cause is considered such that liquid crystal molecules tend to be oriented in the direction of the arrow in FIG. 6 by the rubbing treatment, but the stepped portion of the lower insulating layer 16 at the portions A and C may make a stronger force of orienting liquid crystal molecules parallel to the stepped portion than a force of orienting the crystal molecules in the direction of the arrow, so that liquid crystal molecules existing at the portions A and C are oriented parallel to the stepped portion, which result in causing the inverse orientation under the application of the voltage.

It has been observed by experiments that when the voltage is continuously applied to such a display device for several hours at 50° C, the inverse orientation on the opposite edges of the electrode segments b and c (cross shadowed area) grew toward the inside resulting in material deterioration of the quality of displayed image by a reason which has not yet been theoretically substantiated. The reason why the other segments are not subjected to such a problem has not been theoretically substantiated definitely.

Figure 4:
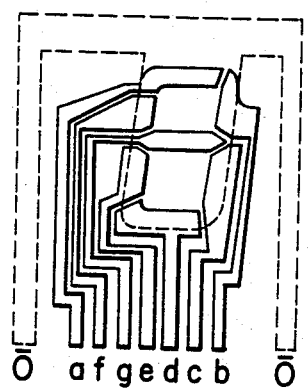
FIG. 4 shows the front and back electrodes of such a conventional field effect type liquid crystal display device.
Figure 5A:
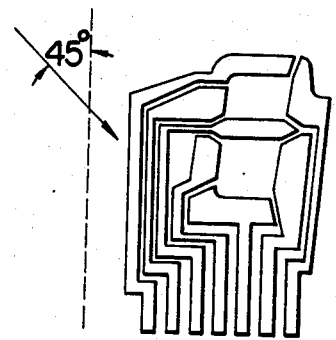
FIGS. 5A and 5B show directions of rub for the electrodes of FIG. 4.
Figure 8:
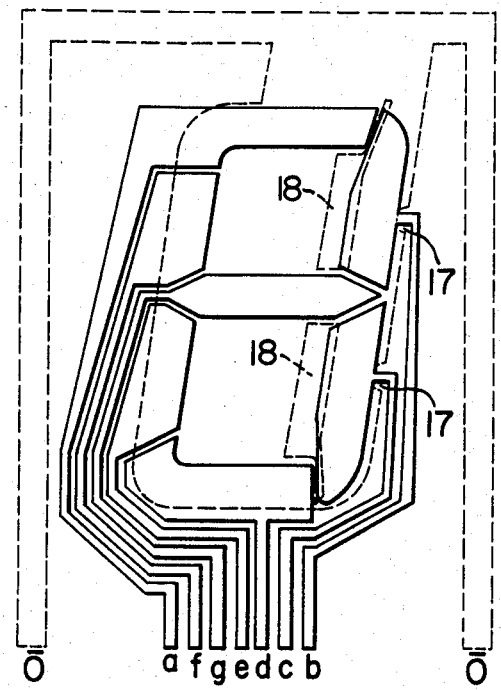
FIG. 8 shows front and back electrodes in accordance with one embodiment of the present invention.

It should be noted here that such a deterioration of the display quality does not appear on the opposite edges of the segments f and e because, as seen from FIG. 4 or 8, the right sides of the segments f and e are defined by the right edges of the front electrode segments f and e where the liquid crystal molecules go down the slope according to the arrow of FIG. 5A. On the other hand, the left sides of the segments f and e are defined by the left edge of the back electrode where the molecules go down the slope according to the arrow of FIG. 5B. As a result, the deterioration of the display does not appear on the opposite sides of the segments f and e.

Figure 5B:
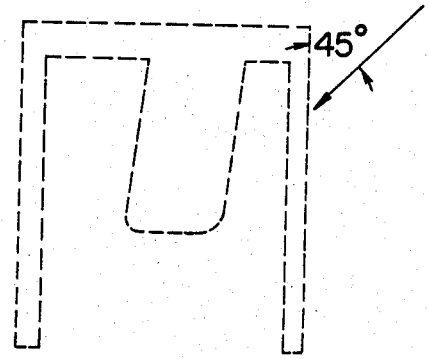

Accordingly the present invention proposes to improve the shape and mutual relation of the electrode segments b, c and the back electrode $\overline{O}$ so that the liquid crystal molecules go down the slope of the right edge of the electrode segments b, c, which defines the right sides of the pattern segments b, c, according to the arrow shown in FIG. 5A and so that the liquid crystal molecules also go down the slope of the back electrode segment $\overline{O}$ according to the arrow shown in FIG. 5B where the left sides of the pattern segments b, c are to be defined.

Figure 9:
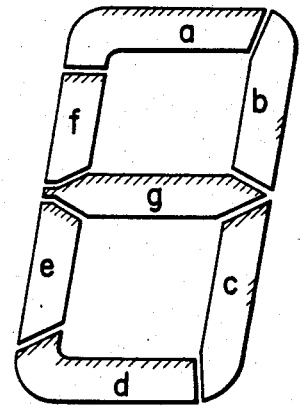
FIG. 9 shows a display of digits by the seven-segment electrode structure of FIG. 8.

Thus, according to the present invention, the right side of the back electrode $\overline{O}$ is extended as shown in FIG. 8 and notches 17 are formed in the back electrode $\overline{O}$ such that the right side edges of the display segments b and c are defined by the right edges of the front electrode segments b and c, and notches 18 are formed in the back electrode $\overline{O}$ such that the left side edges of the display segments b and c are defined by the back electrode $\overline{O}$ and that the edges of the notches 18 in the back electrode $\overline{O}$ define the pattern by the segments b and c. With the arrangement, the liquid crystal molecules go up the slope at the hatched areas shown in FIG. 9 and the cross shadowed areas shown in FIG. 7 (on opposite edges of the segments b and c) are substantially eliminated. As a result, the growth of the inverse orientation toward the inside no longer occurs and a high quality of the displayed image is assured.

Figure 10:
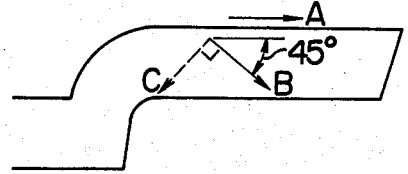
FIG. 10 is a sketch illustrating the difference between states of liquid crystal which cause the deterioration or no-deterioration in the quality of display when the liquid crystal states are coincident with respect to a certain important feature.

One reason why the other areas of the inverse orientation shown in FIG. 7 do not grow is considered as follows. As mentioned before, the liquid crystal molecules are arranged so as to spirally rotate by 90° in the advancing direction of a right-handed screw when they are viewed from the front side of the device. For example, referring to the upper edge of the segment a, this edge portion is defined by the upper edge of the front electrode (segment) a. As shown in FIG. 10, liquid crystal molecules adjacent to the upper edge of the electrode a may be oriented in the direction of the arrow A because of the stepped portion formed by the electrode a, while liquid crystal molecules existing on the central area of the electrode a are oriented in the direction of the arrow B, and liquid crystal molecules adjacent to the back electrode $\overline{O}$ are uniformly oriented in the direction of the arrow C. Although the directions of the arrows B and C makes the angle of 90°, the directions of the arrows A and C makes the larger angle of 135°. In the cases of the opposite edge portions of the segments b and c, such arrows A and C makes a small angle not larger than 90°. On the other hand, in the case of the other areas of the inverse orientation shown in FIG. 7, they make a large angle larger than 90° which appears to prevent such a growth of the inverse orientation in these areas. However, when the liquid crystal molecules which do not express growth of such an inverse orientation in the above-mentioned other areas are observed through a microscope, a certain inverse orientation of the width in the order of 20 to 100 $\mu$m is observed. Thus it is preferred to define or control liquid crystal molecules at the edge portion of a desired pattern by the down structure of the pattern segment portions as far as the pattern permits to fabricate such pattern electrode segments.

In FIG. 5, the directions of rub may be opposite to those illustrated, in which case the growing inverse orientation will appear on opposite sides of the segments f and e. Thus, the notches 17 and 18 in the back electrode $\overline{O}$ in FIG. 8 should be formed to face to the segments f and e and the left side of the pattern by the segments f and e should be defined by the front electrodes f and e.

As described hereinabove, the present invention can provide a field effect type liquid crystal display device having a high quality of image.

What is claimed is:

1. A field effect type liquid crystal digit displaying device including seven front electrode segments a to g and a back electrode $\overline{O}$, a display by right edges of the front electrode segments b and c is defined by the right edges of said front electrode segments b and c, notches are formed in said rear electrode $\overline{O}$ and a display by the left edges of the front electrode segments b and c is defined by the edges of said notches in said rear electrode $\overline{O}$.

2. A field effect type liquid crystal digit displaying device including seven front electrode segments a to g and a back electrode $\overline{O}$, a display by the left edges of the front electrode segments f and e is defined by the left edges of said front electrode segments f and e, notches are formed in said back electrode $\overline{O}$, and a display by the right edges of the front electrode segments f and e is defined by the edges of said notches in said electrode $\overline{O}$.

* * * * *